United States Patent
Schips et al.

(10) Patent No.: US 8,568,633 B2
(45) Date of Patent: Oct. 29, 2013

(54) ELASTIC PARTICLE FOAM BASED ON POLYOLEFIN/STYRENE POLYMER MIXTURES

(71) Applicant: BASF SE, Ludwigshafen (DE)

(72) Inventors: Carsten Schips, Speyer (DE); Klaus Hahn, Kirchheim (DE); Georg Gräßel, Ludwigshafen (DE); Daniela Longo-Schedel, Siegburg (DE); Jens Assmann, Mannheim (DE); Andreas Gietl, Mannheim (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/669,747

(22) Filed: Jan. 29, 2013

(65) Prior Publication Data

US 2013/0140728 A1    Jun. 6, 2013

Related U.S. Application Data

(62) Division of application No. 12/595,275, filed as application No. PCT/EP2008/002774 on Apr. 8, 2008, now abandoned.

(30) Foreign Application Priority Data

Apr. 11, 2007    (EP) .................... 07105953

(51) Int. Cl.
*C08J 9/18*    (2006.01)
(52) U.S. Cl.
USPC ............ 264/51; 264/115; 264/126; 264/141; 264/142; 264/143; 521/56; 521/59

(58) Field of Classification Search
None
See application file for complete search history.

(56) References Cited

U.S. PATENT DOCUMENTS

| | | | |
|---|---|---|---|
| 5,496,864 A | 3/1996 | Henn et al. | |
| 6,593,430 B1 | 7/2003 | Knoll et al. | |
| 2002/0185768 A1* | 12/2002 | Maletzko et al. | ............... 264/51 |
| 2004/0152795 A1 | 8/2004 | Arch et al. | |

FOREIGN PATENT DOCUMENTS

| | | |
|---|---|---|
| DE | 24 13 375 A1 | 10/1975 |
| DE | 24 13 408 A1 | 10/1975 |
| DE | 38 14 783 A1 | 11/1989 |
| EP | 0654488 A1 | 5/1995 |
| EP | 0682079 | 11/1995 |
| WO | WO-95/35335 A1 | 12/1995 |
| WO | WO-97/40079 A1 | 10/1997 |
| WO | WO-00/58380 A1 | 10/2000 |
| WO | WO-0214424 | 2/2002 |
| WO | WO-2005/056652 A1 | 6/2005 |
| WO | WO-2005/092959 A1 | 10/2005 |

* cited by examiner

*Primary Examiner* — Mary F Theisen
(74) *Attorney, Agent, or Firm* — Novak Druce Connolly Bove + Quigg LLP

(57) ABSTRACT

Thermoplastic particle foams which have cells having a mean cell size in the range from 20 to 500 μm and in which the cell membranes have a nanocellular or fibrous structure having pore or fiber diameters below 1500 nm, and also processes for producing them.

14 Claims, 1 Drawing Sheet

ELASTIC PARTICLE FOAM BASED ON POLYOLEFIN/STYRENE POLYMER MIXTURES

CROSS REFERENCE TO RELATED APPLICATIONS

This application is a divisional application of U.S. application Ser. No. 12/595,275, filed Oct. 9, 2009, which is a National Stage of PCT/EP2008/002774 filed Apr. 8, 2008 which in turn claims priority from European Application 07105953.9 filed Apr. 11, 2007, the entire contents of all of which are incorporated herein by reference.

BACKGROUND OF THE INVENTION

The invention relates to thermoplastic particle foams which have cells having a mean cell size in the range from 20 to 500 μm and in which the cell membranes have a nanocellular or fibrous structure having pore or fiber diameters below 1500 nm, and also to processes for producing them.

Expandable polymer mixtures comprising styrene polymers, polyolefins and, if appropriate, solubilizers such as hydrogenated styrene-butadiene block copolymers are known from, for example, DE 24 13 375, DE 24 13 408 or DE 38 14 783. The foams which can be obtained therefrom are said to have better mechanical properties, in particular a better elasticity and a reduced brittleness at low temperatures, and also insensitivity toward solvents such as ethyl acetate and toluene, compared to foams composed of styrene polymers. However, the blowing agent retention capability and the foamability of the expandable polymer mixtures to low densities are not sufficient for processing.

WO 2005/056652 describes particle foam moldings which have a density in the range from 10 to 100 g/l and can be obtained by fusion of prefoamed foam particles produced from expandable, thermoplastic polymer beads. The polymer beads comprise mixtures of styrene polymers and other thermoplastic polymers and can be obtained by melt impregnation and subsequent underwater pelletization under pressure.

Furthermore, elastic particle foams comprising expandable interpolymer particles are known (e.g. US 2004/0152795 A1). The interpolymers can be obtained by polymerization of styrene in the presence of polyolefins in aqueous suspension and form an interpenetrating network of styrene polymers and olefin polymers. However, the blowing agent diffuses rapidly out of the expandable polymer particles, so that they have to be stored at low temperatures and display satisfactory foamability for only a short time.

WO 2005/092959 describes nanoporous polymer foams which can be obtained from multiphase polymer mixtures which comprise blowing agent and have domains in the range from 5 to 200 nm. The domains preferably comprise core-shell particles which can be obtained by emulsion polymerization and in which the solubility of the blowing agent is at least twice as high as in the adjoining phases.

It was an object of the present invention to provide expandable, thermoplastic polymer particles which have a low blowing agent loss and a high expansion capability and can be processed to give particle foams having a high stiffness and at the same time good elasticity, and also a process for producing them.

We have accordingly found the above-described thermoplastic particle foams.

The thermoplastic particle foams preferably have cells having a mean cell size in the range from 50 to 250 μm and a nanocellular structure or a fibrously elongated, disperse phase structure in the cell walls of the thermoplastic particle foams having a mean pore or fiber diameter in the range from 10 to 1000 nm, particularly preferably in the range from 100 to 500 nm.

BRIEF DESCRIPTION OF THE DRAWINGS

The cell structure having nanocellular cell walls and struts can be seen in the transmission electron micrograph (TEM).

Figure 1:
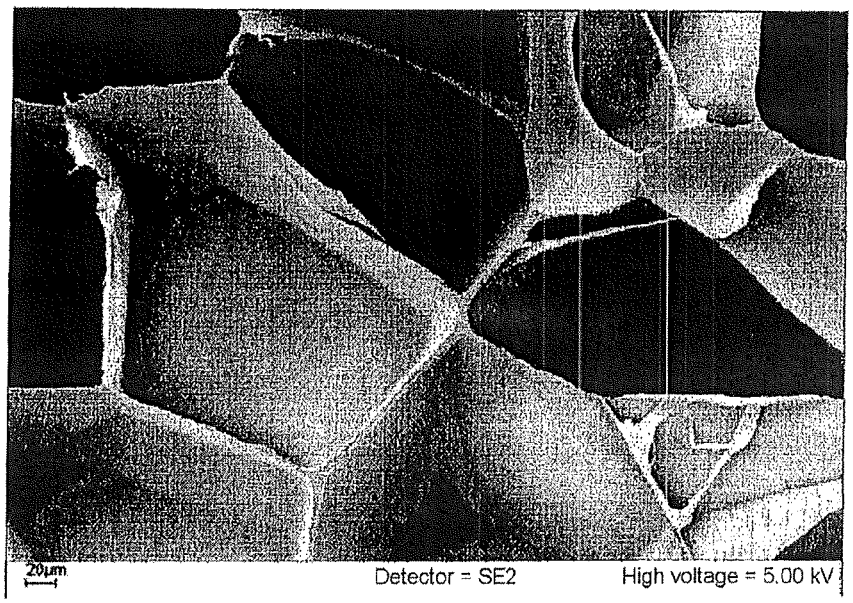
FIG. 1 shows a section through the cells of a thermoplastic particle foam according to the invention.

The polymer matrix of the thermoplastic particle foams preferably comprises a continuous phase which is rich in styrene polymer and a disperse polyolefin-rich phase.

The thermoplastic particle foams particularly preferably comprise a polymer matrix comprising A) from 45 to 98.9% by weight, in particular from 55 to 89.9% by weight, of a styrene polymer, in particular polystyrene, B) from 1 to 45% by weight, in particular from 4 to 37% by weight, of a polyolefin, in particular polyethylene, and C) from 0.1 to 10% by weight, in particular from 3 to 8% by weight, of a hydrogenated or unhydrogenated styrene-butadiene block copolymer.

The thermoplastic particle foams of the invention can be obtained by a process which comprises a) producing a polymer mixture having a continuous phase and a disperse phase by mixing two incompatible thermoplastic polymers and, if appropriate, a compatibilizer, b) impregnating this mixture with a blowing agent and pelletizing it to produce expandable thermoplastic polymer particles, c) prefoaming the expandable, thermoplastic polymer particles to produce foam particles and d) fusing the prefoamed foam particles in a mold by means of hot air or steam at a processing pressure which is kept sufficiently low for the nanocellular or fibrous structure in the cell membranes to be retained and usually to be in the range from 1.5 to 2.3 bar to produce particle foam moldings.

In a further embodiment, the polymer mixture can, in step b), firstly be pelletized and the pellets can subsequently be after-impregnated with a blowing agent in an aqueous phase under superatmospheric pressure at elevated temperature to produce expandable thermoplastic polymer particles. These can subsequently be isolated after cooling to below the melting point of the polymer matrix or can be obtained directly as prefoamed polymer particles (step c) by depressurization.

It is known from the field of multiphase polymer systems that most polymers are immiscible or only slight miscible with one another (Flory), so that demixing to form the respective phases occurs, depending on temperature, pressure and chemical composition. If incompatible polymers are covalently bonded to one another, demixing does not take place on a macroscopic scale but only on a microscopic scale, i.e. on the length scale of the individual polymer chains. In this case, the phenomenon is referred to as microphase separation. This results in many mesoscopic structures, e.g. lamella, hexagonal, cubic and bicontinuous morphologies which have a strong relationship with lyotropic phases.

The polymer mixture having a continuous phase and a disperse phase can be produced by mixing two incompatible thermoplastic polymers, for example in an extruder.

The polymer mixture preferably comprises from 45 to 98.9% by weight, particularly preferably from 55 to 89.9% by weight, of a thermoplastic polymer A), in particular a styrene polymer such as general purpose polystyrene (GPPS) or high-impact polystyrene (HIPS) or a styrene-acrylonitrile copolymer (SAN) or acrylonitrile-butadiene-styrene copolymer (ABS). Particular preference is given to general purpose polystyrene grades having a mean molecular weight in the range from 120000 to 300000 g/mol and a melt volume rate MVR (200° C./5 kg) in accordance with ISO 113 in the range from 1 to 10 cm³/10 min, for example PS 158K, 168 N or 148 G from BASF Aktiengesellschaft. To improve the fusion of the foam particles during processing to produce moldings, it is possible to add grades which flow readily, for example Empera® 156L (Innovene).

As further component B), the polymer mixture preferably comprises from 1 to 45 percent by weight, in particular from 4 to 37% by weight, of a likewise thermoplastic polymer B) which is incompatible with the thermoplastic polymer A). As polymer B), preference is given to using a polyolefin, e.g. homopolymers or copolymers of ethylene and/or propylene, in particular polyethylene, especially when a styrene polymer is used as polymer A). As polypropylenes, it is possible to use, in particular, injection-molding grades such as Adstif® RA 748 T or impact-modified grades such as Clyrell® EM 2484 from Basell. As polyethylenes, it is possible to use commercially available ethylene homopolymers such as LDPE (injection-molding grades), LLDPE and HDPE or copolymers of ethylene and propylene (e.g. Moplen® RP220 and Moplen® RP320 from Basell), ethylene and oktene (Engage®) or ethylene and vinyl acetate (EVA), polyethylene acrylates (EA) such as Surlyn® grades 1901 and 2601 from DuPont or ethylene-butylene acrylates (EBA) such as Lucofin® 1400 HN, 1400 HM from Lucobit AG. The melt volume index MVI (190° C./2.16 kg) of the polyethylenes is usually in the range from 0.5 to 40 g/10 min and the density is in the range from 0.86 to 0.97 g/cm³, preferably in the range from 0.91 to 0.95 g/cm³. In addition, it is possible to use blends comprising polyisobutene (PIB) (e.g. Oppanol® B150 from BASF Aktiengesellschaft).

As the proportion of polyolefin decreases, the ability to retain blowing agent increases significantly. This significantly improves the storage stability and the processability of the expandable, thermoplastic polymer particles. In the range from 4 to 20% by weight of polyolefin as polymer B), expendable thermoplastic polymer particles having a longer storage life are obtained without the elastic properties of the particle foam produced therefrom being impaired. This is reflected, for example, in a lower compression set $\epsilon_{res}$ in the range from 25 to 35%.

To set the desired morphology in a targeted manner, use is usually made of compatibilizers (component C) in amounts of from 0.1 to 10% by weight, preferably from 3 to 8% by weight, based on the polymer matrix.

The compatibilizer leads to improved adhesion between the polyolefin-rich phase and the polystyrene-rich phase and even in small amounts significantly improves the elasticity of the foam compared to conventional EPS foams. Studies on the domain size of the polyolefin-rich phase showed that the compatibilizer stabilizes small droplets by reducing the interfacial tension. An electron micrograph of a section through an expandable polystyrene/polyethylene comprising blowing agent shows disperse polyethylene domains in the polystyrene matrix.

Suitable compatibilizers are, for example, hydrogenated or unhydrogenated styrene-butadiene or styrene-isoprene block copolymers. The total diene content is preferably in the range from 20 to 60% by weight, particularly preferably in the range from 30 to 50% by weight, and the total styrene content is accordingly preferably in the range from 40 to 80% by weight, particularly preferably in the range from 50 to 70% by weight.

Suitable styrene-butadiene block copolymers comprising at least two polystyrene blocks S and at least one styrene-butadiene copolymer block S/B are, for example, star-shaped branched block copolymers as are described in EP-A 0654488.

Further suitable compatibilizers are block copolymers having at least two hard blocks $S_1$ and $S_2$ comprising vinylaromatic monomers together with at least one random soft block B/S comprising vinylaromatic monomers and diene located between them, with the proportion of the hard blocks being above 40% by weight, based on the total block copolymer, and the 1,2-vinyl content of the soft block B/S being below 20%, as are described in WO 00/58380.

Linear styrene-butadiene block copolymers of the general structure S-(S/B)-S which have one or more blocks $(S/B)_{random}$ having a random styrene/butadiene distribution located between the two S blocks are also suitable as compatibilizers. Such block copolymers can be obtained by anionic polymerization in a nonpolar solvent with addition of a polar cosolvent or a potassium salt, as described, for example, in WO 95/35335 or WO 97/40079.

For the purposes of the present invention, the vinyl content is the relative proportion of 1,2 linkages of the diene units, based on the sum of the 1,2, 1,4-cis and 1,4-trans linkages. The 1,2-vinyl content of the styrene-butadiene copolymer block (S/B) is preferably below 20%, in particular in the range from 10 to 18%, particularly preferably in the range from 12 to 16%.

Preference is given to using styrene-butadiene-styrene (SBS) three-block copolymers having a butadiene content of from 20 to 60% by weight, preferably from 30 to 50% by weight, which can be hydrogenated or unhydrogenated, as compatibilizers. These are commercially available, for example, under the trade names Styroflex® 2G66, Styrolux® 3G55, Styroclear® GH62, Kraton® D 1101, Kraton® G 1650, Kraton® D 1155, Tuftec® H1043 or Europren® SOL 6414. These are SBS block copolymers having sharp transitions between B and S blocks. An improvement in the compatibility can additionally be achieved by hydrogenation of the butadiene blocks, e.g. Kraton® G grades.

Furthermore, additives, nucleating agents, plasticizers, flame retardants, soluble and insoluble inorganic and/or organic dyes and pigments, fillers or coblowing agents can be added to the multiphase polymer mixture in amounts which do not impair domain formation and the foam structure resulting therefrom.

As nucleus formers or nucleating agents, it is possible to additionally add, for example, polyolefin waxes or talc in amounts of from 0 to 5% by weight, preferably from 0.5 to 3% by weight, based on the polymers A) to C).

As blowing agent (component D) in step b), preference is given to using from 1 to 15 percent by weight, preferably from 3 to 10 percent by weight, based on the polymer mixture of A) to C), of a physical blowing agent such as $C_3$-$C_8$-hydrocarbons, alcohols, ketones, ethers or halogenated hydrocarbons. Preference is given to using isobutane, n-butane, isopentane, n-pentane or isohexane.

Suitable coblowing agents are ones having a lower selectivity of the solubility in the phase forming the domains, for example gases such as $CO_2$, $N_2$, fluorinated hydrocarbons or noble gases. These are preferably used in amounts of from 0 to 10% by weight, based on the polymer mixture.

Particular preference is given to a continuous process in which a thermoplastic polymer A) which forms the continuous phase, for example polystyrene, is melted in a twin-screw extruder and mixed with a polymer B) which forms the disperse phase and, if appropriate, compatibilizer C) to produce the polymer mixture in step a) and the polymer melt is subsequently conveyed through one or more static and/or dynamic mixing elements and impregnated with the blowing agent in step b). The melt laden with blowing agent can subsequently be extruded through an appropriate die and cut to give foam boards, extrudates or particles.

The melt coming out of the die can also be cut directly by means of underwater pelletization (UWP) to give expandable polymer particles or polymer particles which have been partially foamed to a chosen extent. Setting of a suitable counterpressure and a suitable temperature in the water bath of the UWP thus makes targeted production of foam particles possible.

To produce the expandable polymer particles, the underwater pelletization is generally carried out at pressures in the range from 1.5 to 10 bar. The die plate generally has a plurality of nests having a plurality of holes. At a hole diameter in the range from 0.2 to 1 mm, expandable polymer particles having the preferred average particle diameters in the range from 0.5 to 1.5 mm·0.8 mm are obtained. Expandable polymer particles having a narrow particle size distribution and an average particle diameter in the range from 0.6 to 0.8 mm lead to better filling of automatic molding machines when the moldings have a finely structured shape. Furthermore, a better molding surface having a lower volume of interstices is achieved.

The round or oval particles obtained are preferably foamed to a diameter in the range from 0.2 to 10 mm. Their bulk density is preferably in the range from 10 to 100 g/l.

The mean diameter of the disperse phase of the polymer mixture produced in step a) is preferably in the range from 1 to 2000 nm, particularly preferably in the range from 100 to 1500 nm.

A preferred polymer mixture in step a) is produced by mixing
A) from 45 to 98.9 percent by weight, in particular from 55 to 89.9% by weight, of a styrene polymer, in particular polystyrene,
B) from 1 to 45 percent by weight, in particular from 4 to 37% by weight, of a polyolefin, in particular polyethylene, and
C) from 0.1 to 10 percent by weight, in particular from 3 to 8% by weight, of a hydrogenated or unhydrogenated styrene-butadiene block copolymer.

The invention also provides the expandable, thermoplastic polymer particles which can be obtained as intermediate products in step b) and comprise a polymer matrix comprising
A) from 45 to 98.9 percent by weight, in particular from 55 to 89.9% by weight, of a styrene polymer, in particular polystyrene,
B) from 1 to 45 percent by weight, in particular from 4 to 37% by weight, of a polyolefin, in particular polyethylene, and
C) from 0.1 to 10 percent by weight, in particular from 1 to 8% by weight, of a hydrogenated or unhydrogenated styrene-butadiene block copolymer, with the sum of A) to C) being 100% by weight, and, in addition,
D) from 1 to 15 percent by weight, in particular from 3 to 10% by weight, based on the polymer matrix, of a blowing agent,
E) from 0 to 5, preferably from 0.3 to 3% by weight, of a nucleating agent.

To improve the processability, the finished expandable thermoplastic polymer particles can be coated with glycerol esters, antistatics or anticaking agents.

The fusion of the prefoamed foam beads to produce the molding and the mechanical properties resulting therefrom are improved, in particular, by coating the expandable thermoplastic polymer particles with a glyceryl stearate. Particular preference is given to using a coating comprising from 50 to 100% by weight of glyceryl tristearate (GTS), from 0 to 50% by weight of glyceryl monostearate (GMS) and from 0 to 20% by weight of silica.

The expandable, thermoplastic polymer particles of the invention can be prefoamed by means of hot air or steam to produce foam particles having a density in the range from 8 to 200 kg/m$^3$, preferably in the range from 10 to 50 kg/m$^3$, and subsequently fused in a closed mold to produce foam moldings.

EXAMPLES

Starting Materials

Component A: polystyrene PS 158K from BASF SE
Component B: polyethylene
B1: PE-LLD (LL1201 XV, Exxon Mobil, density=0.925 WI, MVI=0.7 g/10 min, melting point=123° C.)
B2: PE-LLD (LL1001 XV, Exxon Mobil, density=0.918 g/l, MVI=1.0 g/10 min, melting point=120° C.)
Component C:
C: Styrolux® 3G55, styrene-butadiene block copolymer from BASF SE,
Component D: blowing agent: pentane S (20% of isopentane, 80% of n-pentane)
Nucleating agent: talc (HP 320, Omyacarb)

Example 1

22% by weight of LLDPE (LL1201 XV, Exxon Mobil) were melted together with 69.6% by weight of polystyrene (PS 158K, BASF) and 4% by weight of SBS block copolymer (Styrolux® 3G55, BASF) at 220-240° C. in a ZSK 18 twin-screw extruder from Leitritz. The polymer melt was subsequently loaded with 8% by weight of s-pentane, based on the polymer matrix. The polymer melt was then homogenized in two static mixers and cooled to 180° C. 2.2% by weight of talc (HP 320, Omyacarb), based on the polymer matrix, were added as nucleating agent in the form of a masterbatch with 2.2% by weight of polystyrene PS 158K to the main melt stream laden with blowing agent via a side extruder. After homogenization via two further static mixers, the melt was extruded through a heated perforated plate (4 holes having a diameter of 0.65 mm and a perforated plate temperature of 280° C.). The polymer strand was cut by means of underwater pelletization (underwater pressure=12 bar, water temperature=45° C.) so as to give minipellets laden with blowing agent and having a narrow particle size distribution (d'=1.2 mm).

The pellets comprising blowing agent were prefoamed to give foam beads having a low density (15-25 g/l) in an EPS prefoamer and processed at a gauge pressure of 0.7-1.1 bar in an automatic EPS molding machine to produce moldings.

Examples 2 and 3 and Comparative Experiment

Expandable thermoplastic mixtures having the composition in parts by weight indicated in Table 1 were produced in a manner analogous to Example 1. The density and cell count of the foam particles after prefoaming are reported in Table 2.

The blowing agent content of the minipellets was determined immediately after production and after storage for 7 days on filter paper at room temperature and atmospheric pressure by means of GC analysis.

Various mechanical measurements were carried out on the moldings to confirm elasticization of the foam. Table 3 shows the compression set $\epsilon_{res}$ of the foam moldings as determined from the single hysteresis at 75% deformation (advance rate=5 mm/min) in accordance with ISO 3386-1. The compression set $\epsilon_{res}$ is the percentage by which the height of the deformed body has decreased from the original height after 75% deformation. In the examples according to the invention, significant elasticization compared to pure EPS is observed, as can be seen from the very high recovery after compression.

Figure 2:
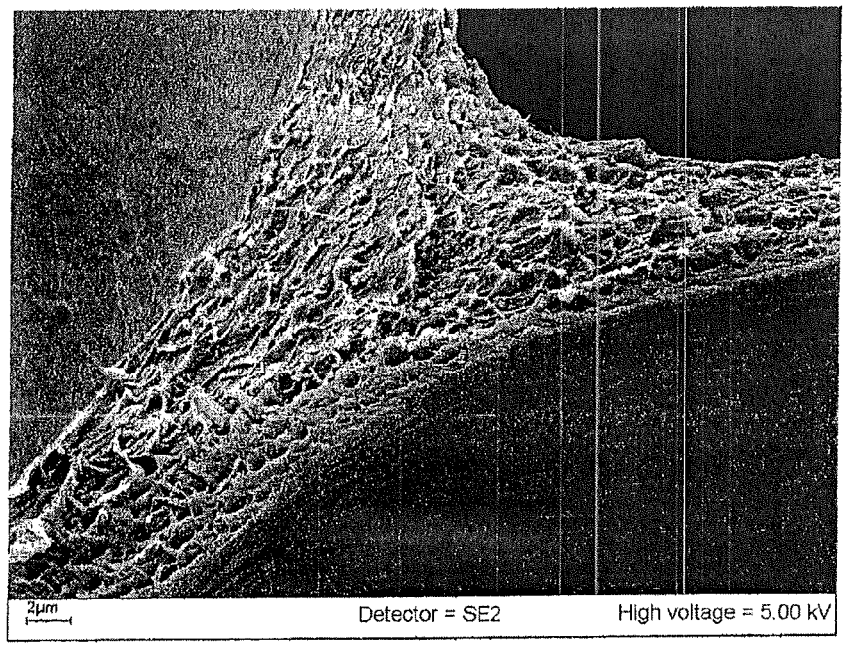
FIG. 2 shows a section magnified by 10× of the cell structure having a nanocellular cell wall shown in FIG. 1.

The transmission electron micrograph (TEM) shows the cell structure (FIG. 1) with nanocellular cell walls and struts (FIG. 2) which contribute to the elasticization. The pores have a size in the order of from 200 to 500 nm and correspond to the PE domains of the minipellets laden with blowing agent.

TABLE 1

Composition of the expandable thermoplastic mixtures (parts by weight)

| | C | Example 1 | Example 2 | Example 3 |
|---|---|---|---|---|
| PS 158K | 97.8 | 71.8 | 59.8 | 46.8 |
| PE | | 22 | 33 | 44 |
| 3G55 | | 4 | 6 | 8 |
| Talc | 2.2 | 2.2 | 2.2 | 2.2 |
| Blowing agent content (s-pentane) | 6.8 | 6.5 | 6.5 | 8.2 |
| Blowing agent content (s-pentane) after 7 days | 5.7 | 4.8 | 4 | 3 |

TABLE 2

Properties of the foam particles

| | C | Example 1 | Example 2 | Example 3 |
|---|---|---|---|---|
| Density [kg/m³] | 18 | 18 | 23 | 26 |
| Cell count [1/mm] | 11.6 | 4.5 | 6.0 | 6.8 |

TABLE 3

Compression set $\epsilon_{res}$ of the foam moldings at 75% deformation

| Processing pressure | C | Example 1 | Example 2 | Example 3 |
|---|---|---|---|---|
| 0.8 bar | 60 | 23 | 32 | |
| 0.9 bar | 59 | 26 | 33 | |
| 1.0 bar | 58 | 28 | 49 | |
| 1.1 bar | 60 | 60 | 55 | 55 |

Examples 4 and 5

To improve the fusion of the foam particles, 0.3% by weight of a coating agent was applied to the surface of the pellets comprising blowing agent from Example 1 in a Lödige mixer. After a storage time of 4 hours, the coated pellets comprising blowing agent were prefoamed and fused to form moldings as in Example 1.

As coating components, glyceryl tristearate (GTS) was used for Example 4 and a mixture of 60% by weight of GTS, 30% by weight of glyceryl monostearate (GMS) and 10% by weight of silica was used for Example 5. The coating agent had a positive effect on the fusion of the prefoamed foam beads to produce the molding. The flexural strength of the moldings obtained in Examples 4 and 5 could be increased to 220 and 227 kPa, respectively, compared to 150 kPa for the moldings obtained from the uncoated pellets in Example 1.

Examples 6 to 12

The components A to C were melted at 220-240° C./130 bar in a ZSK 18 twin-screw extruder from Leitritz. 8 parts by weight of pentane S (20% of isopentane, 80% of n-pentane) were subsequently injected as blowing agent into the polymer melt and incorporated homogenously into the polymer melt by means of two static mixers. The temperature was subsequently reduced to 180°-185° C. via a cooler. 2.2 parts by weight of talc (HP 320, Omyacarb) as nucleating agent were metered in the form of a 50% strength by weight polystyrene masterbatch through a side extruder into the main melt stream laden with blowing agent. After homogenization by means of two further static mixers, the melt was extruded at 4 kg/h through a heated perforated plate (4 holes having a diameter of 0.65 mm and a perforated plate temperature of 280° C.). The polymer strand was cut by means of underwater pelletization (underwater pressure=12 bar, water temperature=45° C.) so as to give minipellets laden with blowing agent and having a narrow particle size distribution (d'=1.1 mm). The proportions by weight of the components A to C are shown in table 4.

Example 13

In a ZE 40 twin-screw extruder from Leitritz, the components A to C were melted at 240-260° C./140 bar and admixed with 2.2 parts by weight of talc (HP 320, Omyacarb) as nucleating agent. 8 parts by weight of pentane S (20% of isopentane, 80% of n-pentane) were subsequently injected as blowing agent into the polymer melt and incorporated homogenously into the polymer melt by means of two static mixers. The temperature was subsequently reduced to 180°-195° C. via a cooler. After further homogenization by means of two further static mixers, the polymer melt was pressed at 50 kg/h and 200-220 bar through a perforated plate maintained at 240-260° C. (hole diameter of 0.6 mm with 7 nests×7 holes or hole diameter of 0.4 mm with 7 nests×10 holes). The polymer strand was cut by means of underwater pelletization (underwater pressure=11-10 bar, water temperature=40° C.-50° C.) so as to give minipellets laden with blowing agent and having a narrow particle size distribution (d'=1.1 mm at a hole diameter of 0.6 mm and 0.8 mm at a hole diameter of 0.4 mm). The proportions by weight of the components A to C are shown in table 4.

The pellets comprising blowing agent were prefoamed to foam beads having a low density (15-25 g/l prefoamed) in an EPS prefoamer and processed at a gauge pressure of 0.7-1.1 bar in an automatic EPS molding machine to produce moldings.

Various mechanical measurements were carried out on the moldings to confirm elasticization of the foam. Table 4 shows the compression set $\epsilon_{res}$ of the foam moldings as determined from the single hysteresis at 75% deformation (advance rate=5 mm/min) in accordance with ISO 3386-1. The compression set $\epsilon_{res}$ is the percentage by which the height of the deformed body has decreased from the original height after 75% deformation. In the examples according to the invention, significant elasticization compared to pure EPS is observed, as can be seen from the very high recovery after compression.

The transmission electron micrograph (TEM) shows the disperse distribution of the polyethylene in the minipellets comprising blowing agent, which contributes to elasticization of the foam after foaming. The PE domains of the minipellets laden with blowing agent have a size in the order of from 200 to 1000 nm.

70% by weight of glyceryl tristearate (GTS) and 30% by weight of glyceryl monostearate (GMS) were used as coating components. The coating agent had a positive effect on the fusion of the preformed foam beads to produce the molding. The flexural strength of the moldings could be increased to 250 or 310 kPa compared to 150 kPa for the moldings obtained from the uncoated pellets.

The small particle sizes of 0.8 mm showed an improvement in the processability to produce the molding in respect of demolding times and filling performance of the tool.

In addition, the surface of the molding became more homogenous than in the case of particles having a diameter of 1.1 mm.

TABLE 4

Composition of the expandable polymer particles (EPS) in proportions by weight and properties of the foam moldings

| Example | 6 | 7 | 8 | 9 | 10 | 11 | 12 | 13 |
|---|---|---|---|---|---|---|---|---|
| Composition of the expandable particles | | | | | | | | |
| Component A) | 48 | 61 | 74 | 76.9 | 89.2 | 93 | 95.2 | 76.9 |
| Component B1) | 44 | 33 | 22 | 19.6 | 9.1 | 6.2 | 4.1 | |
| Component B2) | | | | | | | | 19.6 |
| Component C) | 8 | 6 | 4 | 3.5 | 1.7 | 1 | 0.8 | 3.5 |
| Properties of the foam molding | | | | | | | | |
| Foam density [g/l] | 27.5 | 25.3 | 20.2 | 20.0 | 19.9 | 20.1 | 20.4 | 20.1 |
| Minimum density [g/l] | 23.9 | 21.7 | 16.7 | 17.0 | 15.5 | 15.0 | 14.5 | 17.0 |
| Compressive strength 10% [kPa] | 84 | 97 | 97 | 96 | 98 | 93 | 93 | 91 |
| Flexural strength [kPa] | 180 | 230 | 223 | 261 | 230 | 226 | 236 | 296 |
| Work of bending [Nm] | 2.1 | 5.8 | 3.4 | 3.9 | 3.7 | 3.2 | 2.8 | 4.0 |
| Compression set [%] | 55 | 44 | 28 | 30 | 31 | 28 | 29 | 31 |

The invention claimed is:

1. A process for producing a thermoplastic particle foam molding which has cells having a mean cell size in the range from 20 to 500 μm, wherein the cell membranes have a nanocellular or fibrous structure having pore or fiber diameters below 1500 nm, which comprises
   a) producing a polymer mixture having a continuous phase and a disperse phase by mixing two incompatible thermoplastic polymers,
   b) impregnating this mixture with a blowing agent and pelletizing it to produce expandable thermoplastic polymer particles,
   c) prefoaming the expandable, thermoplastic polymer particles to produce foam particles and
   d) fusing the prefoamed foam particles in a mold by means of hot air or steam at a processing pressure which is kept sufficiently low for the nanocellular or fibrous structure in the cell membranes to be retained to produce a particle foam molding.

2. A process for producing a thermoplastic particle foam molding which has cells having a mean cell size in the range from 20 to 500 μm, wherein the cell membranes have a nanocellular or fibrous structure having pore or fiber diameters below 1500 nm, which comprises
   a) producing a polymer mixture having a continuous phase and a disperse phase by mixing two incompatible thermoplastic polymers,
   b) pelletizing this mixture and after-impregnating it with a blowing agent in an aqueous phase under superatmospheric pressure at elevated temperature to produce expandable thermoplastic polymer particles,
   c) prefoaming the expandable, thermoplastic polymer particles to produce foam particles and
   d) fusing the prefoamed foam particles in a mold by means of hot air or steam at a processing pressure which is kept sufficiently low for the nanocellular or fibrous structure in the cell membranes to be retained to produce a particle foam molding.

3. The process according to claim 1, wherein the mean diameter of the disperse phase of the polymer mixture is in the range from 1 to 1500 nm.

4. The process according to claim 1, wherein the polymer mixture is produced in step a) by mixing
   A) from 45 to 98.9 percent by weight of styrene polymer,
   B) from 1 to 45 percent by weight of polyolefin and
   C) from 0.1 to 10 percent by weight of a hydrogenated or unhydrogenated styrene-butadiene block copolymer.

5. The process according to claim 1, wherein from 1 to 10 percent by weight, based on the polymer mixture, of a $C_3C_8$-hydrocarbon is used as blowing agent in step b).

6. The process according to claim 1, wherein the particle foam molding comprises a polymer matrix which comprises a continuous phase which is rich in styrene polymer and a disperse polyolefin-rich phase.

7. The process according to claim 1, wherein the particle foam molding comprises a polymer matrix which comprises
   A) from 45 to 98.9 percent by weight of styrene polymer,
   B) from 1 to 45 percent by weight of polyolefin and
   C) from 0.1 to 10 percent by weight of a hydrogenated or unhydrogenated styrene-butadiene block copolymer.

8. The process of claim 1, wherein the nanocellular or fibrous structure has a mean pore or fiber diameter in the range from 10 to 1000 nm.

9. The process of claim 2, wherein the nanocellular or fibrous structure has a mean pore or fiber diameter in the range from 10 to 1000 nm.

10. The process according to claim 2, wherein the particle foam molding comprises a polymer matrix which comprises a continuous phase which is rich in styrene polymer and a disperse polyolefin-rich phase.

11. The process according to claim 2, wherein the particle foam molding comprises a polymer matrix which comprises
   A) from 45 to 98.9 percent by weight of styrene polymer,
   B) from 1 to 45 percent by weight of polyolefin and C) from 0.1 to 10 percent by weight of a hydrogenated or unhydrogenated styrene-butadiene block copolymer.

12. The process according to claim 2, wherein the mean diameter of the disperse phase of the polymer mixture is in the range from 1 to 1500 nm.

13. The process according to claim 2, wherein the polymer mixture is produced in step a) by mixing
   A) from 45 to 98.9 percent by weight of styrene polymer,
   B) from 1 to 45 percent by weight of polyolefin and
   C) from 0.1 to 10 percent by weight of a hydrogenated or unhydrogenated styrene-butadiene block copolymer.

14. The process according to claim 2, wherein from 1 to 10 percent by weight, based on the polymer mixture, of a $C_3C_8$-hydrocarbon is used as blowing agent in step b).

\* \* \* \* \*